US012168905B2

(12) United States Patent
Houser

(10) Patent No.: US 12,168,905 B2
(45) Date of Patent: Dec. 17, 2024

(54) SWING GATE MECHANISM TO SWING OPEN AN OVERHEAD LIFT GATE

(71) Applicant: William Clifford Houser, Stanley, NC (US)

(72) Inventor: William Clifford Houser, Stanley, NC (US)

( * ) Notice: Subject to any disclaimer, the term of this patent is extended or adjusted under 35 U.S.C. 154(b) by 182 days.

(21) Appl. No.: 17/697,229

(22) Filed: Mar. 17, 2022

(65) Prior Publication Data

US 2022/0298860 A1 Sep. 22, 2022

Related U.S. Application Data

(60) Provisional application No. 63/162,152, filed on Mar. 17, 2021.

(51) Int. Cl.
*E05F 15/00* (2015.01)
*E05F 15/53* (2015.01)
*E06B 11/02* (2006.01)

(52) U.S. Cl.
CPC ............ *E06B 11/027* (2013.01); *E05F 15/53* (2015.01); *E05Y 2201/454* (2013.01); *E05Y 2900/40* (2013.01)

(58) Field of Classification Search
CPC .. E06B 11/027; E05F 15/53; E05Y 2201/454; E05Y 2900/40
USPC ......... 49/149, 176, 177, 190, 197, 198, 199, 49/200
See application file for complete search history.

(56) References Cited

U.S. PATENT DOCUMENTS

| | | | | |
|---|---|---|---|---|
| 2,554,801 | A | 5/1951 | Vogel | |
| 2,796,183 | A | 6/1957 | Cline et al. | |
| 2,937,885 | A | 5/1960 | Skow | |
| 3,125,355 | A | 3/1964 | Snuggins | |
| 3,132,878 | A | 5/1964 | Puydt et al. | |
| 3,265,407 | A | 8/1966 | Paddock | |
| 5,732,967 | A | 3/1998 | Behling | |
| 6,006,814 | A * | 12/1999 | Dalpe | E06B 3/9632 160/116 |
| 6,279,939 | B1 | 8/2001 | Austin | |
| 7,201,206 | B2 * | 4/2007 | Griebel | E05B 65/0021 160/116 |
| 2009/0195643 | A1 | 8/2009 | Neuman | |
| 2015/0306930 | A1 | 10/2015 | Olson | |
| 2021/0196085 | A1 * | 7/2021 | Placencia | E05D 7/1072 |

FOREIGN PATENT DOCUMENTS

FR 2871189 A1 * 12/2005 ......... E05D 13/1215

* cited by examiner

*Primary Examiner* — Daniel J Troy
*Assistant Examiner* — Daniel Alvarez
(74) *Attorney, Agent, or Firm* — Jeffrey C. Watson, Esq.; Grell & Watson Patent Attorneys LLC

(57) ABSTRACT

A swing gate mechanism to swing open an overhead lift gate system includes an overhead swing gate. The overhead swing gate has a pivot side and a catch side. A first gate power arm is configured to move along a first overhead guide track on a first side of the overhead lift gate system. A second gate power arm is configured to move along a second overhead guide track on a second side of the overhead lift gate system. At least one hinge is connected between the pivot side of the overhead swing gate and the first gate power arm. The at least one hinge is configured to allow the overhead swing gate to swing open by rotating about the first gate power arm.

17 Claims, 6 Drawing Sheets

SWING GATE MECHANISM TO SWING OPEN AN OVERHEAD LIFT GATE

CROSS-REFERENCE TO RELATED APPLICATIONS

This application claims benefit to U.S. Provisional Patent Application No. 63/162,152 filed on Mar. 17, 2021 entitled MANUALLY OPEN OVERHEAD HYDRAULIC LIFT GATE, which is incorporated by reference in its entirety.

FIELD OF THE DISCLOSURE

The present disclosure relates to gates and gate systems, like for use in the entrance and/or exit of parking garages. More particularly, the instant disclosure relates to a hydraulic lift gate system for use in the entrance and/or exit of parking garages or like structures with a swing gate mechanism to swing open an overhead lift gate system, like an overhead hydraulic lift gate.

BACKGROUND

Generally speaking, gates, like tilt gates, are often installed in the entrances and/or exits of parking garages or other like structures. Lift gates include a flat panel that tilts as they're lifted upwards to rest flat overhead or near the ceiling. The typical lifting system includes an overhead operator with a motor that drives an arm for lifting the gate. Overhead gate openers are generally commercially used in underground parking garages where space is at a premium. They lift the gate overhead very similar to a typical garage door opener. In this instance the gate may weigh much more than a residential garage door, thus, the operator and hardware are built much heavier to accommodate these loads.

As parking garages have various size openings for the entrance and/or exit, gates and the systems they operate on typically need to be custom designed to fit the desired entrance/exit opening with the desired operating features required or desired by the owner. One problem that has been discovered is the time, effort, and training it takes to install current gates and their lift systems. For example, in addition to the time it takes for the pre-work of designing the gate and the lift system and features, a standard install of a tilt gate and lift system with standard operating features by experienced installers can take a week's worth of time and effort or more to install. As a result, the entrances and exits are either unusable and/or not secured for an undesired lengthy period of time. As one should readily understand, it is clearly desirable to shorten the length of time it takes to install and make the installation of the gates and lifting systems easier.

Another problem that has been discovered is the danger associated with installing current gates and lift systems. The current standard systems have a spring-loaded arm assembly to reduce the force required to raise the gate. This spring-loaded arm assembly is very difficult to initially install onto the gate, as the gate is often times too heavy to be manually lifted. As such, the spring-loaded arm assembly has to be stretched down to reach the gate. This process is very difficult and has been discovered to lead to damage of parts and/or injury to the installers. As such, it is clearly desirable to provide a lift gate system that is easier and safer to install.

Another problem that has been discovered with current lift gate systems is the difficulty in aligning the tracks squarely with the gates. The alignment of the tracks is important for operating the lift gate system properly and/or efficiently. As such, it is clearly desirable to provide a lift gate system that is easier to align the tracks.

Another problem that has been discovered with current lift gate systems is that, to conceal the operator inside the parking garage to prevent tampering and unauthorized access (i.e. the operator must be positioned on the inside of the parking garage), the gate must be lifted out towards the outside to open. This forces the gate to open in the same direction for both the entrance and the exit. As a result, extra clearance must be provided before or after the gate to allow the gate to open and close. Thus, it is desirable to provide a lift gate system that can open the gate in either direction, while still concealing the operator from the outside.

U.S. Pat. No. 9,677,314, incorporated herein in its entirety, provided a hydraulic lift gate system and method of installation thereof designed to address the problems noted above. U.S. Pat. No. 9,677,314 discloses a lift gate system that includes a gate, a first pole, a second pole, a header and an internal operator that is hydraulic. The first pole is configured to attach to the ground on one side of the gate and included a first track attached approximate to a first top. The second pole is configured to attach to the ground on the opposite side of the gate from the first pole and includes a second track attached approximate to a second top. The header interconnects the first top with the second top. The internal operator is configured for lifting the gate, where the internal operator is inside the first pole, the second pole, and/or the header.

The instant disclosure recognizes the problem and/or need of the hydraulic lift gate system of U.S. Pat. No. 9,677,314 that there is no manual feature to the system disclosed therein that allows the hydraulic gate to be manually operated, i.e., that allows the hydraulic gate to be manually opened and closed. This manual override feature may be needed in the event of a failure, like when the power goes out, or the hydraulic internal operator needs service, as the gates or doors of such systems are very heavy. As such, there is clearly a need for a means or feature configured to open the hydraulic gate of U.S. Pat. No. 9,677,314, like when it is stuck in the closed or down position.

The instant disclosure may be designed to address at least certain aspects of the problems or needs discussed above by providing a swing gate mechanism configured to swing open an overhead hydraulic lift gate.

SUMMARY

The present disclosure may solve the aforementioned limitations of the currently available lift gates and lift gate systems, by providing a feature to swing open an overhead lift gate system, like an overhead hydraulic lift gate. The swing gate mechanism to swing open the overhead lift gate system may generally include an overhead swing gate. The overhead swing gate may have a pivot side and a catch side. A first gate power arm may be configured to move along a first overhead guide track on a first side of the overhead lift gate system. A second gate power arm may be configured to move along a second overhead guide track on a second side of the overhead lift gate system. At least one hinge may be connected between the pivot side of the overhead swing gate and the first gate power arm. The at least one hinge may be configured to allow the overhead swing gate to swing open by rotating about the first gate power arm.

One feature of the disclosed swing gate mechanism to swing open the overhead hydraulic gate system may be that when the overhead swing gate is not swung open from the first gate power arm and the overhead swing gate is fixed between the first gate power arm and the second gate power arm, the overhead swing gate may have an overhead gate operation. The overhead gate operation may function via the first gate power arm moving in the first overhead guide track and the second gate power arm moving in the second overhead guide track.

Another feature of the disclosed swing gate mechanism to swing open the overhead hydraulic gate system may be that when the overhead swing gate is swung open from the first gate power arm, the overhead swing gate may have a swing gate operation.

In select embodiments of the disclosed swing gate mechanism to swing open the overhead lift gate system, the swing gate operation of the swing gate mechanism may be configured to be manually swung open and closed.

In other select embodiments of the disclosed swing gate mechanism to swing open the overhead lift gate system, the swing gate mechanism may further include a swing operator. The swing operator may be configured to control rotation of the overhead swing gate about the first gate power arm. Wherein, the swing gate operation of the swing gate mechanism may be configured to be controllably opened and closed by the swing operator. In select embodiments, the swing operator may include a proximal end pivotally connected to the first gate power arm, and a distal end pivotally connected to a driving point positioned on the overhead swing gate. Wherein, the swing operator may be configured to adjust a distance between the distal end and the proximal end for controlling the rotation of the overhead swing gate about the first gate power arm for opening and closing the swing gate operation of the swing gate mechanism. In select embodiments, the swing operator may include a hydraulic operator configured to control the rotation of the overhead swing gate about the first gate power arm.

Another feature of the disclosed swing gate mechanism to swing open the overhead lift gate system may be that when the overhead swing gate is not swung open from the first gate power arm and the overhead swing gate is fixed between the first gate power arm and the second gate power arm, the overhead swing gate functions as an overhead gate via the first gate power arm moving in the first overhead guide track and the second gate power arm moving in the second overhead guide track, and when the overhead swing gate is swung open from the first gate power arm, the overhead swing gate functions as a swing gate.

In select embodiments of the disclosed swing gate mechanism to swing open the overhead lift gate system, each of the at least one hinges may include a male hinge portion, and a female hinge portion. In select embodiments, and clearly not limited thereto, each male hinge portion may be connected to the first gate power arm and each female portion may be connected to the pivot side of the overhead swing gate. Where, the male hinge portion may include a pin protruding downward, and the female hinge portion may include a pivot hole on a top side. Wherein, the pivot hole may be configured to receive the pin from the male hinge portion for creating the hinge between the first gate power arm and the pivot side of the overhead swing gate.

In select embodiments of the disclosed swing gate mechanism to swing open the overhead lift gate system, each of the at least one hinges may include a top hinge and a bottom hinge. The top hinge may be connected between an upper arm portion of the first gate power arm and a top gate portion of the overhead swing gate. The bottom hinge may be connected between a lower arm portion of the first gate power arm and a bottom gate portion of the overhead swing gate.

Another feature of the disclosed swing gate mechanism to swing open the overhead lift gate system may be that the second gate power arm may include a catching mechanism. The catching mechanism may be configured to stop and secure the overhead swing gate in a swung closed position between the first gate power arm and the second gate power arm. In select embodiments, the catching mechanism may include a catch plate. In select embodiments, and clearly not limited thereto, the catch plate may be mounted on the second gate power arm and may protrude therefrom toward the first gate power arm. In select embodiments, the catch plate may be sized a height of the overhead swing gate. Whereby, when the overhead swing gate is in the swung closed position, the catch plate may be configured to contact the overhead swing gate throughout the entire catch side of the overhead swing gate.

In select embodiments of the disclosed swing gate mechanism to swing open the overhead lift gate system, the overhead lift gate system may include the overhead swing gate, a first pole, a second pole, a header, and an internal operator. The first pole may be configured to attach to a ground surface on the first side of the overhead swing gate and may include the first overhead guide track attached approximate to a first top. The second pole may be configured to attach to the ground surface on the second side opposite of the overhead swing gate from the first pole. The second pole may include the second overhead guide track attached approximate to a second top. The header may interconnect the first top with the second top. The internal operator may be configured for lifting the overhead swing gate via the first gate power arm and the second gate power arm. In select embodiments, the internal operator may be inside one of the first pole, the second pole, and/or both the first pole and the second pole. In select embodiments, the internal operator may be a hydraulic operator. The hydraulic operator may include at least one hydraulic cylinder configured to lengthen and shorten for raising and lowering the overhead swing gate via the first gate power arm and the second gate power arm.

Another feature of the disclosed swing gate mechanism to swing open the overhead lift gate system may be that each of the first and second overhead guide tracks may include a guide wheel for each overhead guide track.

Another feature of the disclosed swing gate mechanism to swing open the overhead lift gate system may be that each of the first and second poles may include a flange adapted to attach each pole to an anchor in the ground surface.

Another feature of the disclosed swing gate mechanism to swing open the overhead lift gate system may be that the swing gate mechanism is designed and configured to convert the overhead lift gate system to have a swing gate operation. The swing gate operation is configured to allow the overhead swing gate to swing open.

In another aspect, the instant disclosure embraces an overhead lift gate system including the swing gate mechanism in any embodiment and/or combination of embodiments shown and/or described herein. Wherein, the swing gate mechanism may be designed and configured to convert the overhead lift gate system to have a swing gate function configured to swing open the overhead swing gate.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

Figure 1:
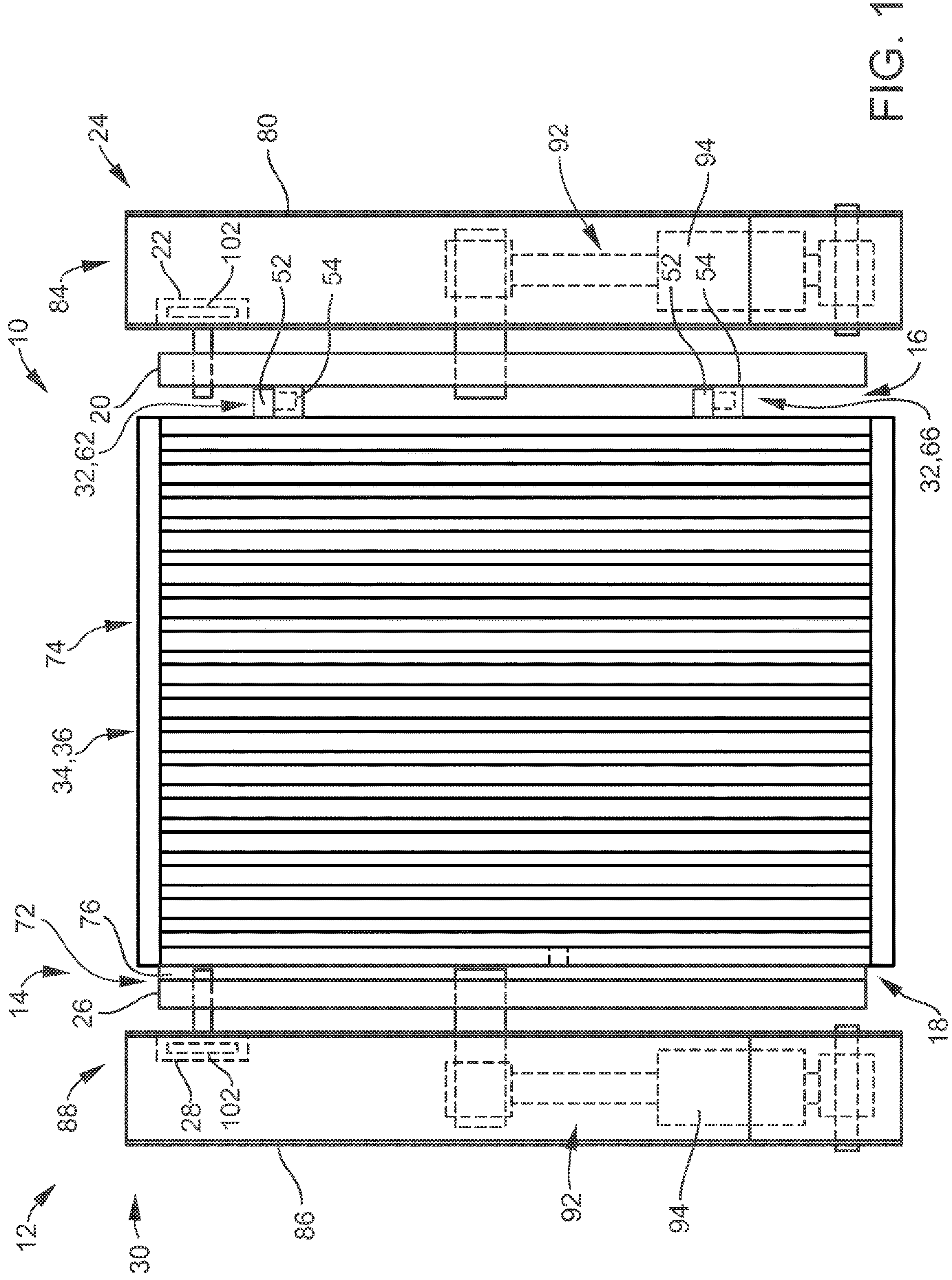
FIG. 1 is a front view of the swing gate mechanism configured to swing open an overhead lift gate system according to select embodiments of the instant disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-6, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring to FIGS. 1-6, the present disclosure may solve the aforementioned limitations of the currently available lift gates and lift gate systems, by providing a feature to swing open an overhead lift gate, like an overhead hydraulic lift gate. Namely, the disclosed swing gate mechanism 10 may be configured to swing open an overhead hydraulic lift gate, like that disclosed in U.S. Pat. No. 9,677,314. As such, the components and operation of U.S. Pat. No. 9,677,314 are incorporated herein in their entirety. However, the disclosure is not so limited and swing gate mechanism 10 may be utilized in various other overhead gate systems as desired.

Swing gate mechanism 10 may be designed and configured to swing open overhead lift gate system 12. Swing gate mechanism 10 may generally include overhead swing gate 14 with first gate power arm 20 and second gate power arm 26. Overhead swing gate 14 may have pivot side 16 and catch side 18. First gate power arm 20 may be configured to move along first overhead guide track 22 on first side 24 of overhead lift gate system 12. Second gate power arm 26 may be configured to move along second overhead guide track 28 on second side 30 of overhead lift gate system 12. At least one hinge 32 may be connected between pivot side 16 of overhead swing gate 14 and the first gate power arm 20. The at least one hinge 32 may be configured to allow overhead swing gate 14 to swing open by rotating about first gate power arm 20, as best shown in FIG. 4.

Figure 5:
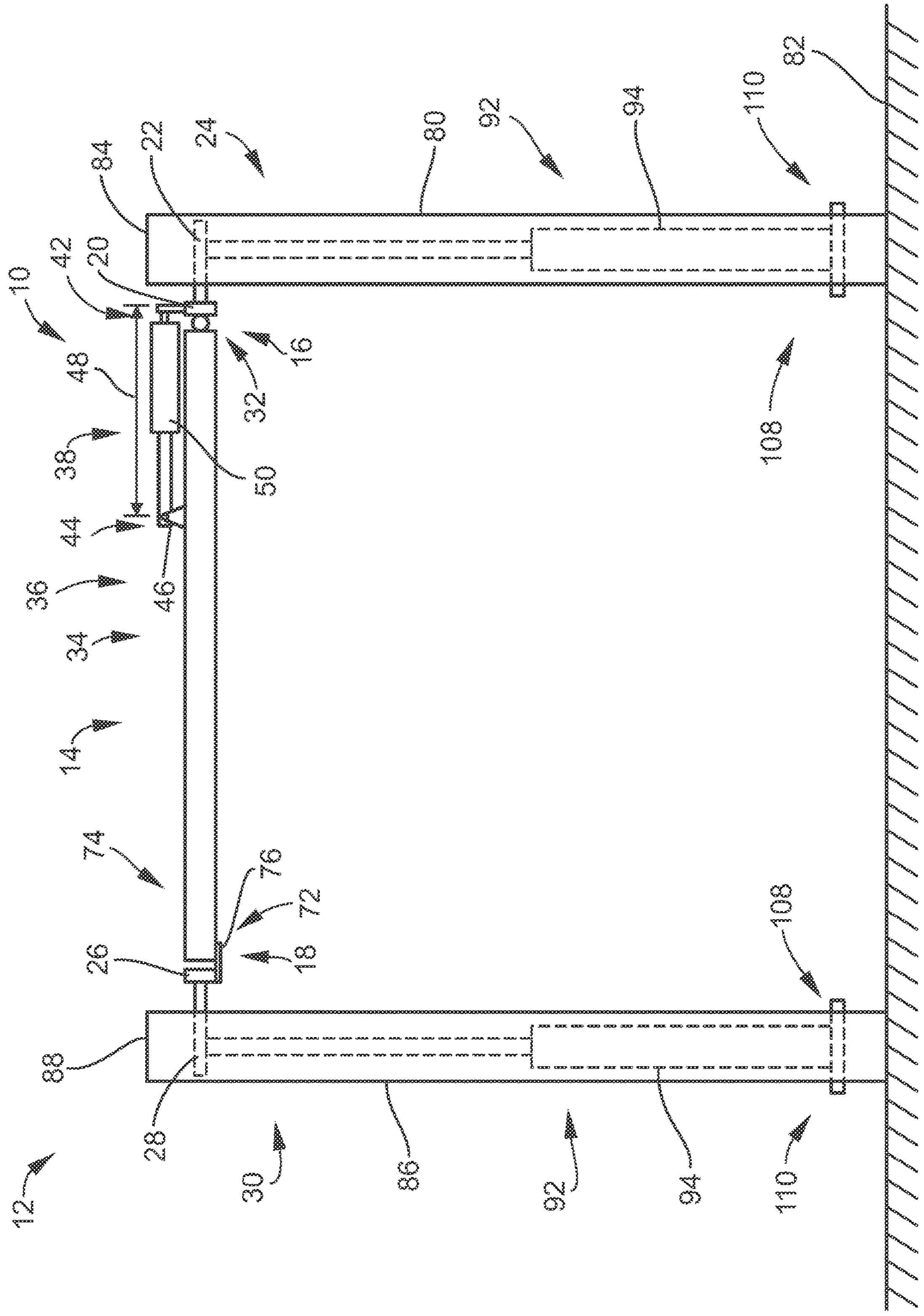
FIG. 5 is a front view of the swing gate mechanism of FIG. 4 showing the overhead gate operation of the overhead swing gate.

One feature of swing gate mechanism 10 to swing open overhead lift gate system 12 be that when overhead swing gate 14 is not swung open from first gate power arm 20 and overhead swing gate 14 is fixed between first gate power arm 20 and second gate power arm 26, overhead swing gate 14 may have overhead gate operation 34, like as best shown in FIG. 5. As an example, and clearly not limited thereto, this overhead gate operation 34 would be similar to the operation of the hydraulic lift gate disclosed in U.S. Pat. No. 9,677,314. The difference may be that overhead gate operation 34 may function via first gate power arm 20 moving in first overhead guide track 22 and second gate power arm 26 moving in second overhead guide track 28. In other words, overhead swing gate 14 is not directly linked to first overhead guide track 22 and second overhead guide track 28 for operating overhead swing gate 14, but includes first gate power arm 20 and second gate power arm 26 linked therebetween for operating overhead swing gate 14.

Another feature of swing gate mechanism 10 to swing open overhead lift gate system 12 may be that when overhead swing gate 14 is swung open from first gate power arm 20, overhead swing gate 14 may have swing gate operation 36. This swing gate operation 36 is best shown in FIG. 4. In select embodiments of swing gate mechanism 10 to swing open overhead lift gate system 12, swing gate operation 36 of swing gate mechanism 10 may be configured to be manually swung open and closed.

Figure 4:
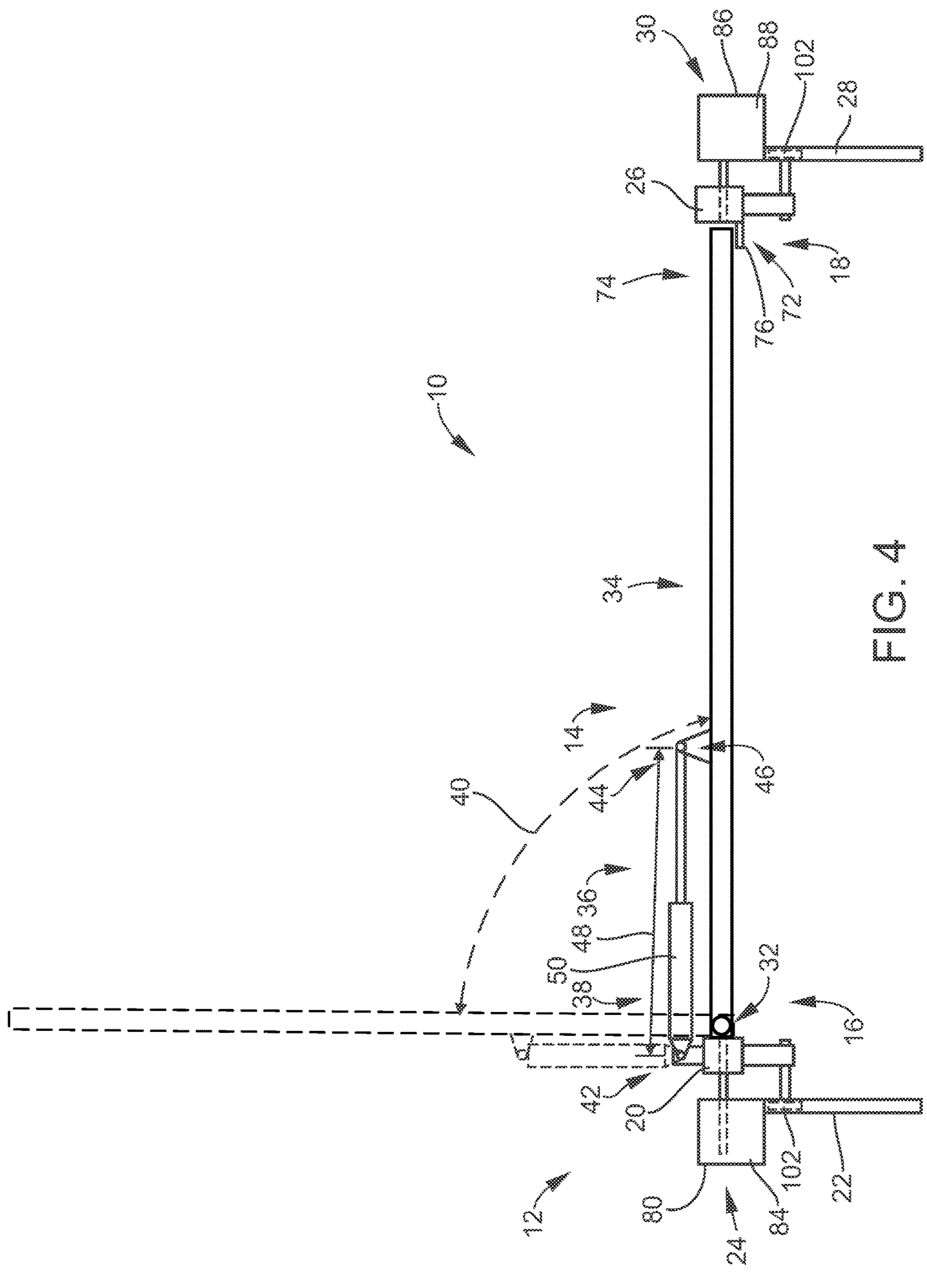
FIG. 4 is a top view of the swing gate mechanism configured to swing open an overhead lift gate system according to select embodiments of the instant disclosure showing the swing gate operation of the overhead swing gate.

Referring now specifically to FIGS. 4 and 5, in other select embodiments of swing gate mechanism 10 to swing open overhead lift gate system 12, swing gate mechanism 10 may further include swing operator 38. Swing operator 38 may be configured to control rotation 40 of overhead swing gate 14 about first gate power arm 20. Wherein, swing gate operation 36 of swing gate mechanism 10 may be configured to be controllably opened and closed by swing operator 38. In select embodiments, swing operator 38 may include proximal end 42 pivotally connected to first gate power arm 20, and distal end 44 pivotally connected to driving point 46 positioned on overhead swing gate 14. Wherein, swing operator 38 may be configured to adjust distance 48 between distal end 44 and proximal end 42 for controlling rotation 40 of overhead swing gate 14 about first gate power arm 20 for opening and closing swing gate operation 36 of swing gate mechanism 10. In select embodiments, as shown in the Figures, and clearly not limited thereto, swing operator 38 may include hydraulic operator 50 configured to control rotation 40 of overhead swing gate 14 about first gate power arm 20. Swing operator 38 may be designed to be disengaged from overhead swing gate 14, like by removing bolts or pins, for manual control of overhead swing gate 14, like for a power outage or the like.

Accordingly, swing gate mechanism 10 may allow for overhead swing gate 14 of overhead lift gate system 12 to have both overhead gate operation 34 and swing gate operation 36 as needed. In select embodiments, swing operator 38 may be configured to swing overhead swing gate 14 open and close in the event of a failure in overhead lift gate system 12, like in the event of a hydraulic failure in internal operator 92 or hydraulic cylinder 94.

Hinge 32 or a plurality of hinges 32 may be included with swing gate mechanism 10 to swing open overhead lift gate system 12. Each hinge may be any shape style or design of hinging device or connections. In select embodiments, and clearly not limited thereto, each of the at least one hinges 32 may include male hinge portion 52, and female hinge portion 54. In select embodiments, and clearly not limited thereto, each male hinge portion 52 may be connected to first gate power arm 20 and each female portion may be connected to pivot side 16 of overhead swing gate 14 (or vice versa). Where, male hinge portion 52 may include pin 56 protruding downward, and female hinge portion 54 may include pivot hole 58 on top side 60. Wherein, pivot hole 58 may be configured to receive pin 56 from male hinge portion 52 for creating the hinge between first gate power arm 20 and pivot side 16 of overhead swing gate 14. Accordingly, in this configuration, hinges 32 on first gate power arm 20 may be designed and configured to allow the forces from overhead lift gate system 12 to be applied to overhead swing gate 14 from first gate power arm 20.

Figure 2:
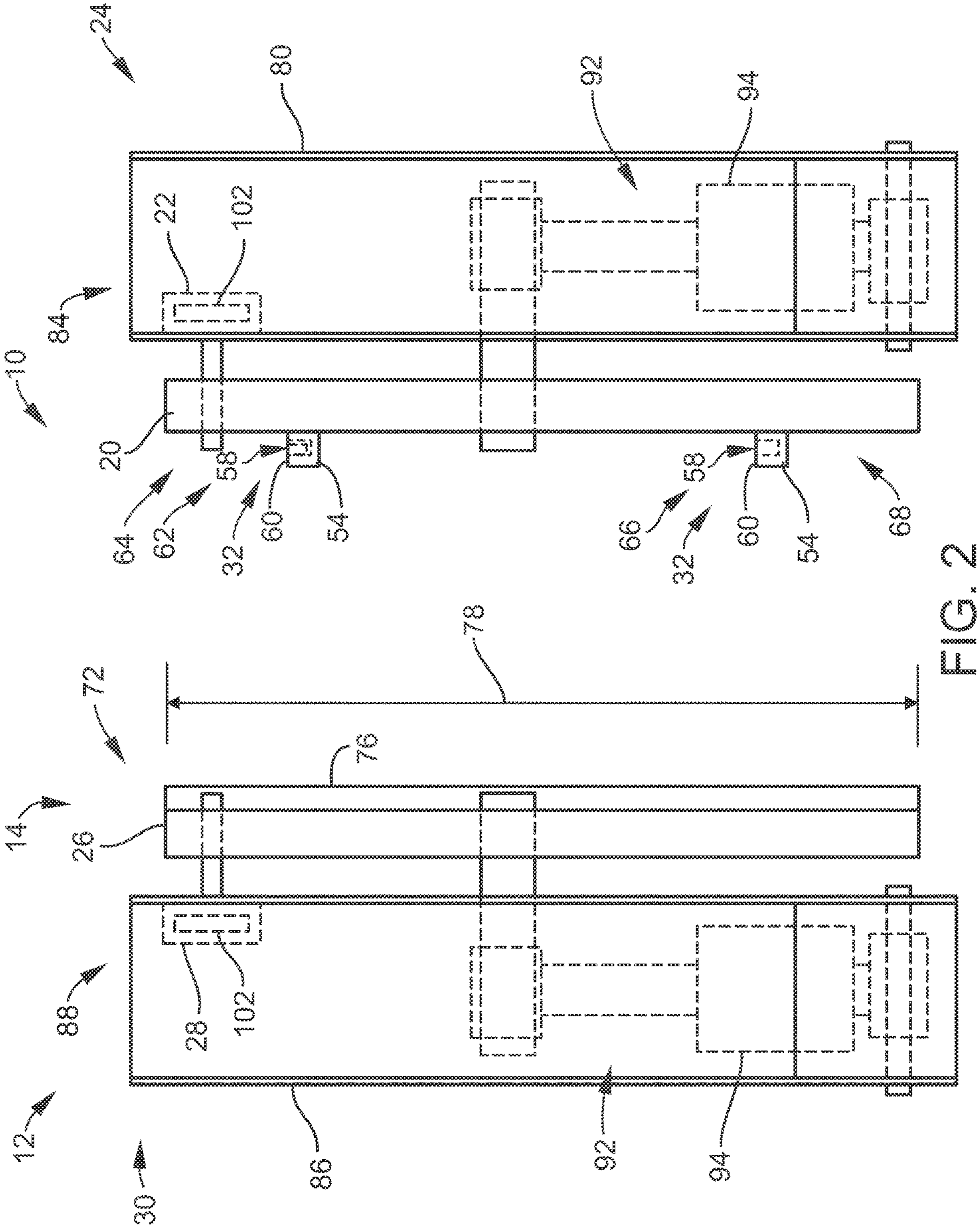
FIG. 2 is a front view of the swing gate mechanism of FIG. 1 with the overhead swing gate removed to show the first gate power arm and the second gate power arm.
Figure 3:
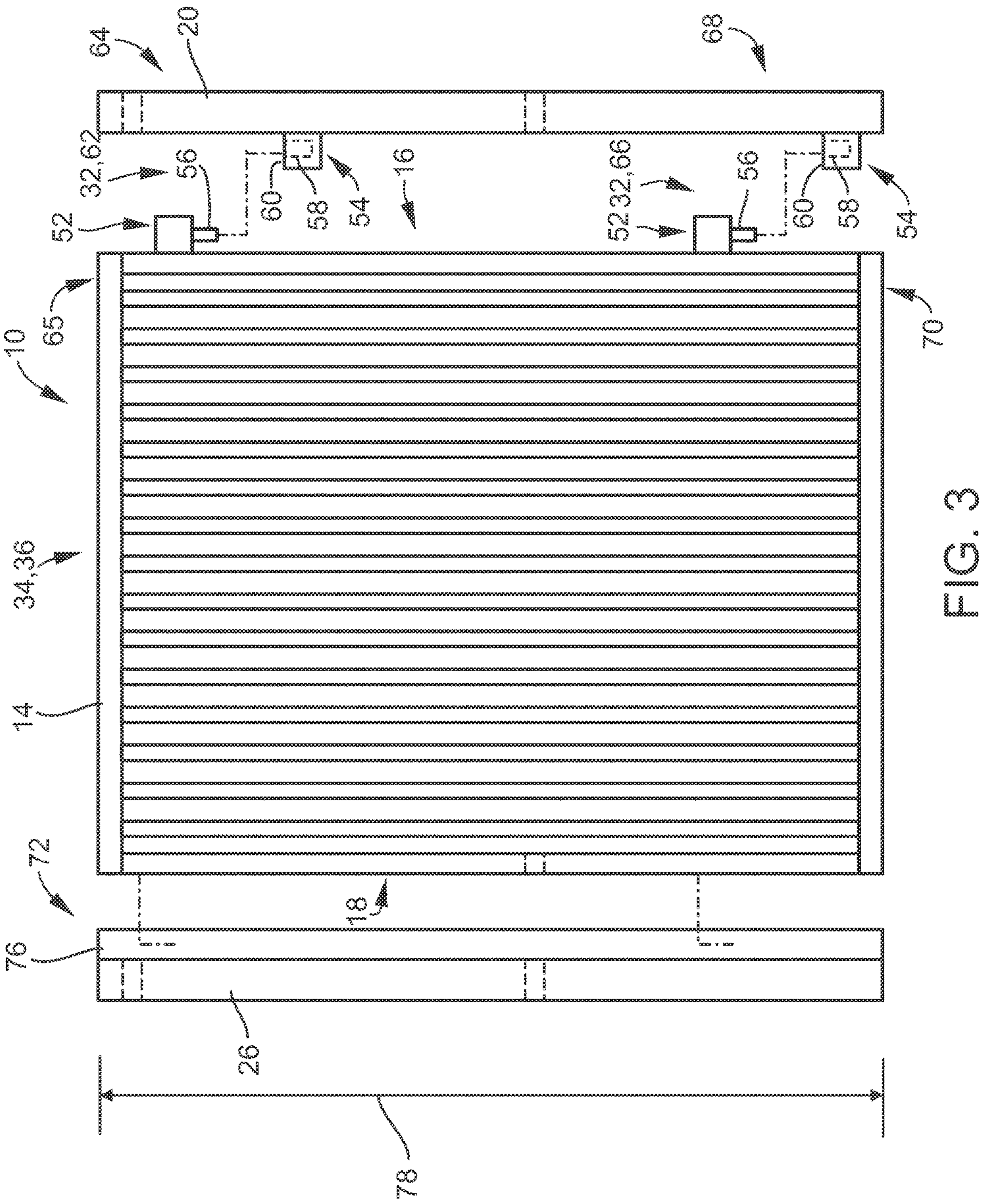
FIG. 3 is a front partially disassembled view of the overhead swing gate of the swing gate mechanism of FIG. 1 showing the overhead swing gate partially disassembled from the first gate power arm and the second gate power arm.

As best shown in FIGS. 1-3, in select embodiments of swing gate mechanism 10 to swing open overhead lift gate system 12, each of the at least one hinges 32 may include, but is clearly not limited thereto, top hinge 62 and bottom hinge 66. Top hinge 62 may be connected between upper arm portion 64 of first gate power arm 20 and top gate portion 65 of overhead swing gate 14. Bottom hinge 66 may be connected between lower arm portion 68 of first gate power arm 20 and bottom gate portion 70 of overhead swing gate 14.

Referring now to FIGS. 2-5, another feature of swing gate mechanism 10 to swing open overhead lift gate system 12 may be that second gate power arm 26 may include catching mechanism 72. Catching mechanism 72 may be configured to stop and secure overhead swing gate 14 in swung closed position 74 between first gate power arm 20 and second gate power arm 26. Catching mechanism 72 may include any device, mechanisms and/or means configured to stop and secure overhead swing gate 14 in swung closed position 74 between first gate power arm 20 and second gate power arm 26. As examples, and clearly not limited thereto, catching mechanism 72 may include any mechanical fasteners or the like, including, but not limited to, any bolts, screws, pins, latches, clamps, the like, etc., configured to secure overhead swing gate 14 on second gate power arm 26. Securing overhead swing gate 14 on second gate power arm 26 may allow the forces from overhead lift gate system 12 to be applied to overhead swing gate 14 from second gate power arm 26. In select embodiments, as shown in the Figures, catching mechanism 72 may include catch plate 76. In select embodiments, and clearly not limited thereto, catch plate 76 may be mounted on second gate power arm 26 and may protrude therefrom toward first gate power arm 20. In select embodiments, catch plate 76 may be sized height 78 of overhead swing gate 14. Whereby, when overhead swing gate 14 is in swung closed position 74 (see FIGS. 1, 4 and 5), catch plate 76 may be configured to contact overhead swing gate 14 throughout the entire catch side 18 of overhead swing gate 14.

Figure 6:
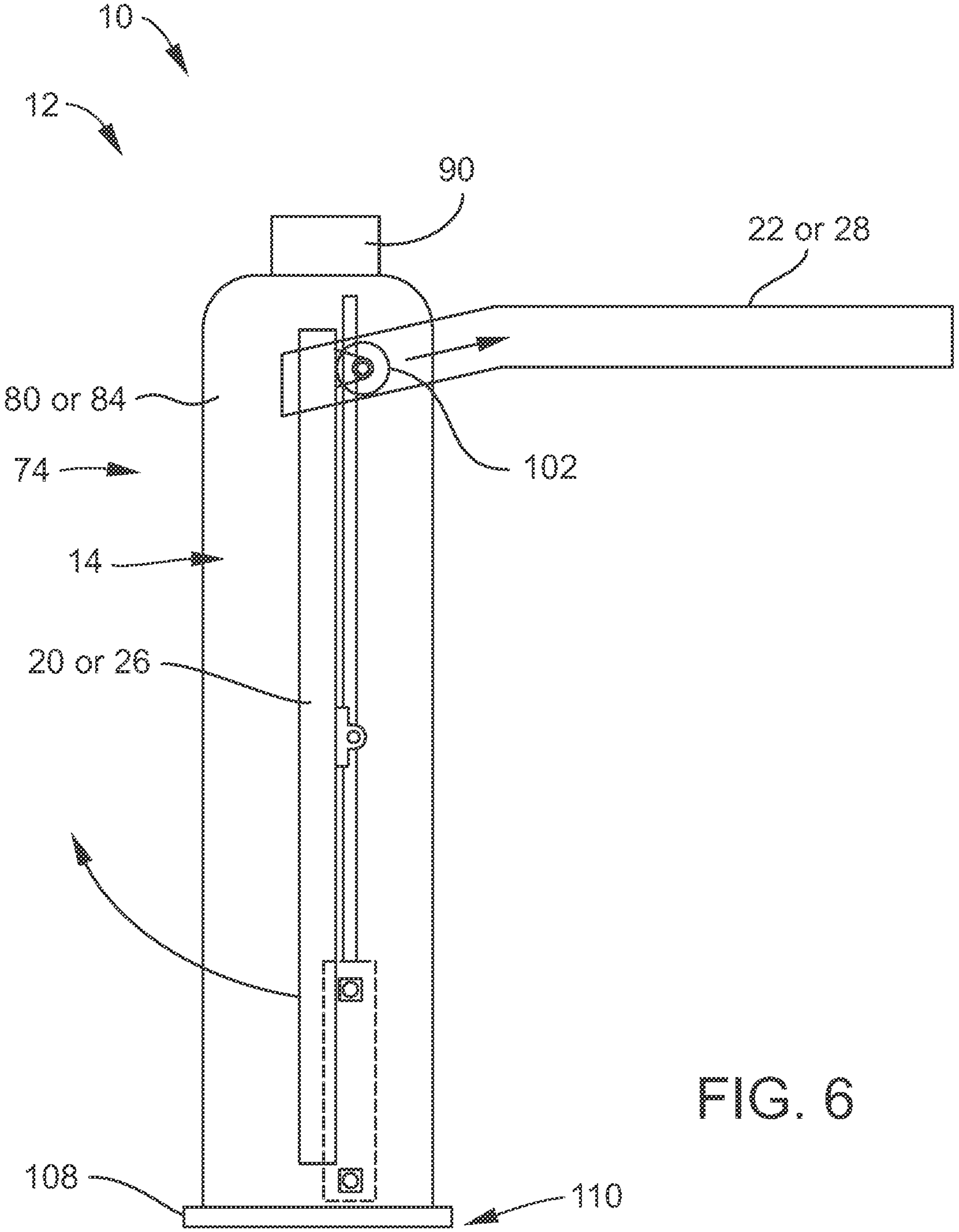
FIG. 6 is a side view of the swing gate mechanism configured to swing open an overhead lift gate system according to select embodiments of the instant disclosure.

As shown in FIGS. 1-6, swing gate mechanism 10 may be designed to provide a means and mechanism to swing open overhead swing gate 14 in overhead lift gate system 12. This overhead lift gate system 12 may generally include overhead swing gate 14, first pole 80, second pole 86, header 90, and internal operator 92. First pole 80 may be configured to attach to ground surface 82 on first side 24 of overhead swing gate 14 and may include first overhead guide track 22 attached approximate to first top 84. Second pole 86 may be configured to attach to ground surface 82 on second side 30 opposite of overhead swing gate 14 from first pole 80. Second pole 86 may include second overhead guide track 28 attached approximate to second top 88. Header 90 may interconnect first top 84 with second top 88 (see FIG. 6). Internal operator 92 may be configured for lifting overhead swing gate 14 via first gate power arm 20 and second gate power arm 26. Internal operator 92 may include any device, machine, mechanism or meahs configured for lifting overhead swing gate 14 via first gate power arm 20 and second gate power arm 26. In select embodiments, internal operator 92 may be housed or positioned inside one of first pole 80, second pole 86, header 90, and/or combinations thereof, like both first pole 80 and second pole 86. In select embodiments, internal operator 92 may be a hydraulic operator. The hydraulic operator may include at least one hydraulic cylinder 94, like as shown in FIGS. 1, 2, and 5, configured to lengthen and shorten for raising and lowering overhead swing gate 14 via first gate power arm 20 and second gate power arm 26. In select embodiments of overhead lift gate system 12, each of the first and second overhead guide tracks 22 and 28 may include guide wheel 102 for each overhead guide track (see FIGS. 1, 2, 4 and 6). Referring specifically to FIGS. 5 and 6, in select embodiments of overhead lift gate system 12, each of first and second poles 80 and 85 may include flange 108 adapted to attach each pole to anchor 110 in ground surface 82.

In sum, swing gate mechanism 10 to swing open the overhead lift gate system 12 may be designed and configured to convert overhead lift gate system 12 to have swing gate operation 36, as best shown in FIG. 4, while still allowing it to have overhead gate operation 34, as best shown in FIGS. 5 and 6. Swing gate operation 36 may be configured to allow overhead swing gate 14 to swing open when overhead lift gate system 12 is not functioning, has lost power, the like etc.

As such, a feature of the present disclosure may be its ability to disengage the hydraulic system of overhead lift gate system 12, in the event of a failure, and manually swing open overhead swing gate 14.

Another feature of the present disclosure may be its ability to continue automatically in the event of a hydraulic failure by using swing operator 38 to swing overhead swing gate 14 open and close.

In the specification and/or figures, typical embodiments of the disclosure have been disclosed. The present disclosure is not limited to such exemplary embodiments. The use of the term “and/or” includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A swing gate mechanism to swing open an overhead lift gate system including:

an overhead swing gate with a pivot side and a catch side;

a first gate power arm configured to move along a first overhead guide track on a first side of the overhead lift gate system;

a second gate power arm configured to move along a second overhead guide track on a second side of the overhead lift gate system;

at least one hinge connected between the pivot side of the overhead swing gate and the first gate power arm, the at least one hinge is configured to allow the overhead swing gate to swing open by rotating about the first gate power arm;

wherein, when the overhead swing gate is not swung open from the first gate power arm and the overhead swing gate is fixed between the first gate power arm and the second gate power arm, the overhead swing gate has as an overhead gate operation via the first gate power arm moving in the first overhead guide track and the second gate power arm moving in the second overhead guide track; and wherein, when the overhead swing gate is swung open from the first gate power arm via the at least one hinge connected between the pivot side of the overhead swing gate and the first gate power arm, the overhead swing gate has as a swing gate operation.

2. The swing gate mechanism of claim 1, wherein the swing gate operation of the swing gate mechanism is configured to be manually swung opened and closed.

3. The swing gate mechanism of claim 1 further including a swing operator configured to control rotation of the overhead swing gate about the first gate power arm, wherein the swing gate operation of the swing gate mechanism is configured to be controllably opened and closed by the swing operator.

4. The swing gate mechanism of claim 3, wherein the swing operator including:

a proximal end pivotally connected to the first gate power arm;

a distal end pivotally connected to a driving point positioned on the overhead swing gate; and wherein, the swing operator is configured to adjust a distance between the distal end and the proximal end for controlling the rotation of the overhead swing gate about the first gate power arm for opening and closing the swing gate operation of the swing gate mechanism.

5. The swing gate mechanism of claim 3, wherein the swing operator including a hydraulic operator configured to control the rotation of the overhead swing gate about the first gate power arm.

6. The swing gate mechanism of claim 1, wherein each of the at least one hinges including:

a male hinge portion; and a female hinge portion.

7. The swing gate mechanism of claim 6, wherein each of the at least one hinges including:

the male hinge portion connected to the first gate power arm, the male hinge portion including a pin protruding downward;

the female hinge portion connected to the pivot side of the overhead swing gate, the female hinge portion including a pivot hole on a top side; and wherein, the pivot hole is configured to receive the pin from the male hinge portion for creating one of the hinges between the first gate power arm and the pivot side of the overhead swing gate.

8. The swing gate mechanism of claim 1, wherein each of the at least one hinges including:

a top hinge, the top hinge is connected between an upper arm portion of the first gate power arm and a top gate portion of the overhead swing gate; and a bottom hinge, the bottom hinge is connected between a lower arm portion of the first gate power arm and a bottom gate portion of the overhead swing gate.

9. The swing gate mechanism of claim 1, wherein the second gate power arm including a catching mechanism, the catching mechanism is configured to stop and secure the overhead swing gate in a swung closed position between the first gate power arm and the second gate power arm.

10. The swing gate mechanism of claim 9, wherein the catching mechanism including a catch plate.

11. The swing gate mechanism of claim 10, wherein the catch plate is mounted on the second gate power arm and protruding therefrom toward the first gate power arm.

12. The swing gate mechanism of claim 11, wherein the catch plate is sized a height of the overhead swing gate, whereby when the overhead swing gate is in the swung closed position, the catch plate is configured to contact the overhead swing gate throughout the entire catch side of the overhead swing gate.

13. The swing gate mechanism of claim 1, wherein the overhead lift gate system including:

the overhead swing gate;

a first pole configured to attach to a ground surface on the first side of the overhead swing gate including the first overhead guide track attached approximate to a first top;

a second pole configured to attach to the ground surface on the second side opposite of the overhead swing gate from the first pole, the second pole including the second overhead guide track attached approximate to a second top;

a header interconnecting the first top with the second top;

an internal operator configured for lifting the overhead swing gate via the first gate power arm and the second gate power arm, where said internal operator being inside one of said first pole, said second pole, or a combination thereof; and wherein said internal operator being a hydraulic operator including: at least one hydraulic cylinder configured to lengthen and shorten for raising and lowering the overhead swing gate via the first gate power arm and the second gate power arm.

14. The swing gate mechanism of claim 13, wherein each of said first overhead guide track and said second overhead guide track including a guide wheel.

15. The swing gate mechanism of claim 13, wherein each of said first pole and said second pole including a flange, each flange is adapted to attach the first pole or the second pole to an anchor in the ground surface.

16. A swing gate mechanism to swing open an overhead lift gate system including:

an overhead swing gate with a pivot side and a catch side, a first pole, a second pole, a header and an internal operator, where the first pole is configured to attach to a ground surface on one side of the gate and includes a first overhead guide track attached approximate to a first top, the second pole is configured to attach to the ground surface on an opposite side of the gate from the first pole and includes a second overhead guide track attached approximate to a second top, the header interconnects the first top with the second top, the internal operator is configured for lifting the gate, where the internal operator is inside the first pole or the second pole and is a hydraulic operator, at least one hinge connected between the pivot side of the overhead swing gate and the first gate power arm, the at least one hinge is configured to allow the overhead swing gate to swing open by rotating about the first gate power arm the swing gate mechanism is designed and configured to convert the overhead lift gate system to have a swing gate operation configured to allow the overhead swing gate to swing open;

wherein, when the overhead swing gate is not swung open from the first gate power arm and the overhead swing gate is fixed between the first gate power arm and the second gate power arm, the overhead swing gate has as an overhead gate operation via the first gate power arm moving in the first overhead guide track and the second gate power arm moving in the second overhead guide track; and wherein, when the overhead swing gate is swung open from the first gate power arm via the at least one hinge connected between the pivot side of the overhead swing gate and the first gate power arm, the overhead swing gate has as a swing gate operation.

17. An overhead lift gate system including:

a swing gate mechanism including:

an overhead swing gate with a pivot side and a catch side;

a first gate power arm configured to move along a first overhead guide track on a first side of the overhead lift gate system;

a second gate power arm configured to move along a second overhead guide track on a second side of the overhead lift gate system;

at least one hinge connected between the pivot side of the overhead swing gate and the first gate power arm, the at least one hinge is configured to allow the overhead swing gate to swing open by rotating about the first gate power arm; and wherein, the swing gate mechanism is designed and configured to convert the overhead lift gate system to have a swing gate operation configured for swinging open the overhead swing gate;

wherein, when the overhead swing gate is not swung open from the first gate power arm and the overhead swing gate is fixed between the first gate power arm and the second gate power arm, the overhead swing gate has as an overhead gate operation via the first gate power arm moving in the first overhead guide track and the second gate power arm moving in the second overhead guide track; and wherein, when the overhead swing gate is swung open from the first gate power arm via the at least one hinge connected between the pivot side of the overhead swing gate and the first gate power arm, the overhead swing gate has as a swing gate operation.

* * * * *